(12) United States Patent
Nakanishi et al.

(10) Patent No.: US 10,087,835 B2
(45) Date of Patent: Oct. 2, 2018

(54) ENGINE

(71) Applicant: YANMAR CO., LTD., Osaka-shi, Osaka (JP)

(72) Inventors: Takao Nakanishi, Osaka (JP); Kiyoyuki Okuyama, Yamagata (JP)

(73) Assignee: Yanmar Co., Ltd., Osaka-shi (JP)

( * ) Notice: Subject to any disclaimer, the term of this patent is extended or adjusted under 35 U.S.C. 154(b) by 54 days.

(21) Appl. No.: 15/078,578

(22) Filed: Mar. 23, 2016

(65) Prior Publication Data

US 2016/0281600 A1    Sep. 29, 2016

(30) Foreign Application Priority Data

Mar. 27, 2015  (JP) .................................. 2015-66361

(51) Int. Cl.
| | | |
|---|---|---|
| *F02B 77/02* | (2006.01) | |
| *F02F 3/28* | (2006.01) | |
| *F02F 1/24* | (2006.01) | |
| *B60R 13/08* | (2006.01) | |
| *B63H 21/36* | (2006.01) | |
| *F02B 77/11* | (2006.01) | |

(52) U.S. Cl.
CPC .......... *F02B 77/02* (2013.01); *B60R 13/0838* (2013.01); *B63H 21/36* (2013.01); *F02B 77/11* (2013.01); *F02F 1/24* (2013.01); *F02F 3/28* (2013.01)

(58) Field of Classification Search
CPC ...... F02B 77/02; F02B 77/11; B60R 13/0838; B63H 21/36; F02F 1/24; F02F 3/28
USPC ........................................................ 123/198 E
See application file for complete search history.

(56) References Cited

U.S. PATENT DOCUMENTS

| | | | | |
|---|---|---|---|---|
| 2006/0228956 | A1* | 10/2006 | Watabe ................ | B63H 20/007 440/6 |
| 2011/0155888 | A1* | 6/2011 | Jordahl .................. | A01B 73/00 248/647 |
| 2014/0369863 | A1* | 12/2014 | Hibino .................. | F02B 37/013 417/243 |

(Continued)

FOREIGN PATENT DOCUMENTS

| | | | |
|---|---|---|---|
| JP | S63297769 | A | 12/1988 |
| JP | 2001287603 | A * | 10/2001 |

(Continued)

OTHER PUBLICATIONS

Translation of JP2012097676 A.*

(Continued)

*Primary Examiner* — Joseph Dallo
*Assistant Examiner* — Yi-Kai Wang
(74) *Attorney, Agent, or Firm* — Norton Rose Fulbright US LLP

(57) ABSTRACT

The purpose of the present invention is to provide an engine in which operation of a control system and communication of information can be performed easily form above the engine. A blank part is formed in a top cover provided on an upper surface of an engine arranged in an engine room of a ship so as to penetrate vertically the top cover, an engine side operation part is arranged so as to face the blank part, and an upper end of the engine side operation part is positioned lower than an upper surface of the top cover.

2 Claims, 8 Drawing Sheets

(56) References Cited

U.S. PATENT DOCUMENTS

| | | | | |
|---|---|---|---|---|
| 2015/0151820 A1* | 6/2015 | Yasukawa | ............. | F02F 7/0068 |
| | | | | 440/49 |
| 2015/0159524 A1* | 6/2015 | Kawakami | ................ | F01L 1/46 |
| | | | | 123/90.37 |
| 2016/0003210 A1* | 1/2016 | Andersson | ............ | F02P 3/0807 |
| | | | | 123/406.12 |
| 2016/0076479 A1* | 3/2016 | Ruppel | ................... | F02F 7/006 |
| | | | | 123/193.3 |

FOREIGN PATENT DOCUMENTS

| | | | |
|---|---|---|---|
| JP | 2012097676 A | * | 5/2012 |
| JP | 2013-148046 A | | 8/2013 |
| JP | 2015024803 A | | 2/2015 |

OTHER PUBLICATIONS

Translation of JP2001287603 A.*
European Search Report dated Sep. 6, 2016 for European Application No. EP 16 16 1734, ISA/EPO, Munich, Germany.
Notice of Reasons for Rejection dated Dec. 12, 2017 for Japanese Patent Application No. 2015-066361, 3 pages.

* cited by examiner

ENGINE

BACKGROUND OF THE INVENTION

Technical Field

The present invention relates to an art providing an operation part in a top cover which covers an upper part of an engine for a ship.

Background Art

Conventionally, an art enabling easily maintenance and the like of an engine for a ship arranged in a lower part of a hull from an upper surface side of the engine is known (for example, see the Patent Literature 1).

PRIOR ART REFERENCE

Patent Literature

Patent Literature 1: the Japanese Patent Lad Open Gazette JP 2013-148046 A

DISCLOSURE OF INVENTION

Problems to be Solved by the Invention

In the case of the engine of the Patent Literature 1, since a control device (ECU, engine control unit) is arranged at a side of a cylinder block, it is necessary for maintaining a control system of the engine arranged at a bottom of the ship to detach to top cover and put hands therein, whereby the work is difficult.

Then, the purpose of the present invention is to provide an engine in which operation of a control system and communication of information can be performed easily form above the engine.

Means for Solving the Problems

The problems to be solved by the present invention have been described above, and subsequently, the means of solving the problems will be described below.

According to the invention, a blank part is formed in a top cover provided on an upper surface of the engine arranged in an engine room of a ship so as to penetrate vertically the top cover, an engine side operation part is arranged so as to face the blank part, and an upper end of the engine side operation part is positioned lower than an upper surface of the top cover.

According to the invention, a control unit controlling the engine is arranged in a side surface of the engine, the engine side operation part is connected to the control unit, and when viewed in plan, the blank part of the top cover in which the engine side operation part is arranged is shifted toward the control unit.

According to the invention, the engine side operation part has an emergency stop switch, a maintenance connector and a fuse box of a control system.

Effect of the Invention

The present invention brings the following effects.

An operator can access easily to the engine side operation part from the upper side in the engine room, whereby operation and maintenance can be performed without detaching a cover and the like. Since the engine side operation part is lower than the upper surface of the top cover, the engine side operation part is protected with the top cover without being damaged by accidentally tramping and being stumbled thereon.

DETAILED DESCRIPTION OF THE INVENTION

Figure 1:
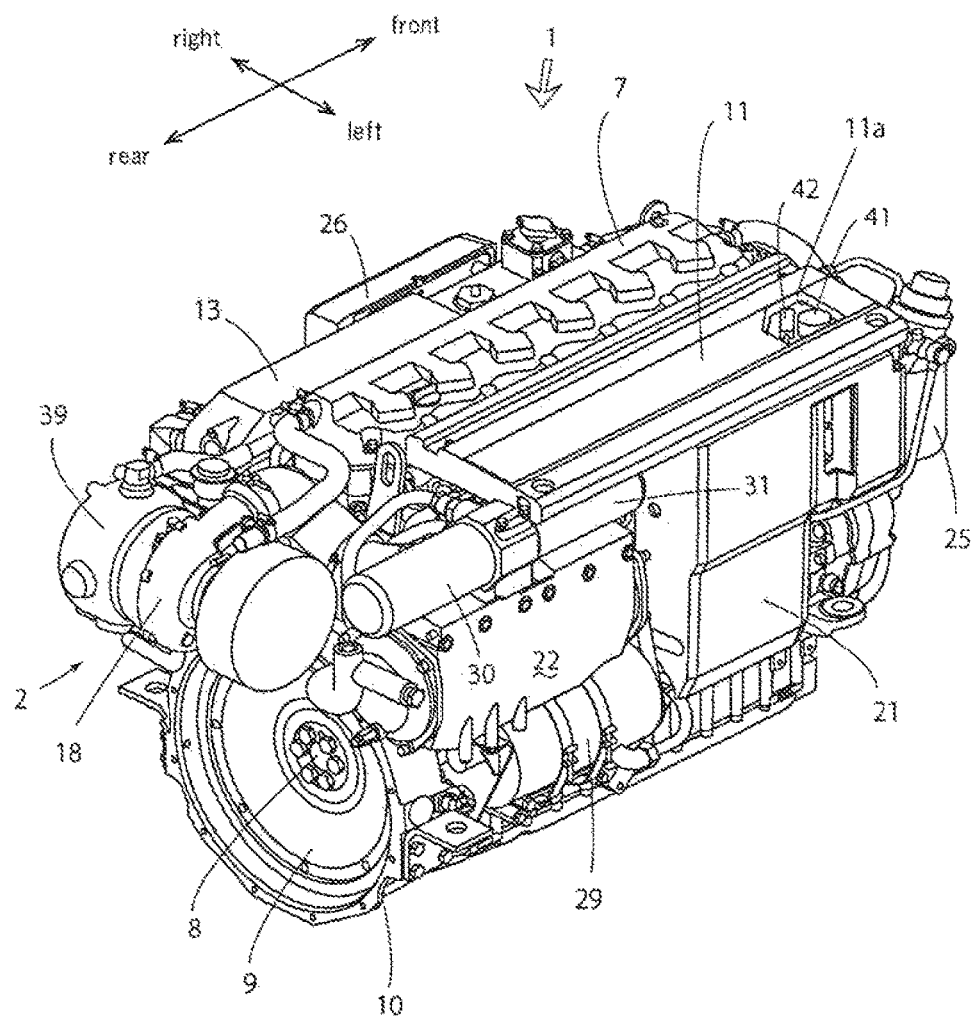
FIG. 1 is a perspective rear view of an engine.
Figure 2:
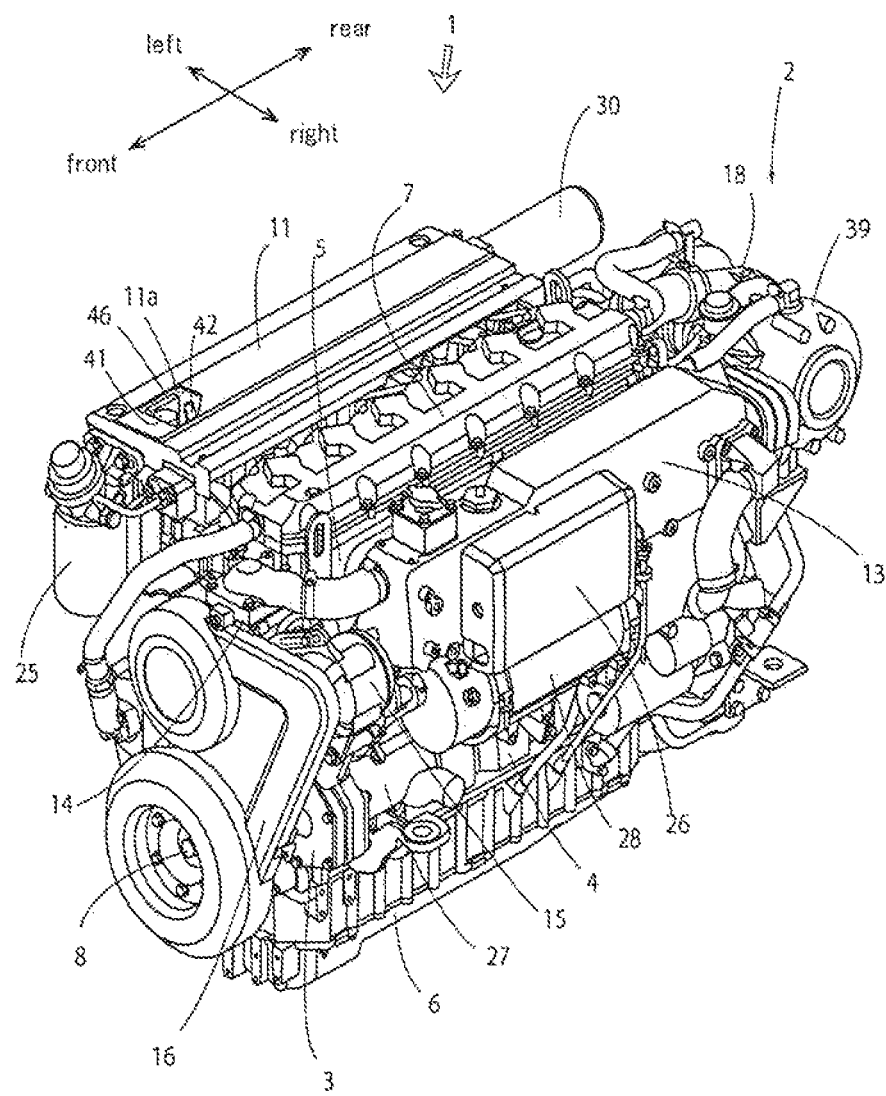
FIG. 2 is a perspective front view of the engine.
Figure 3:
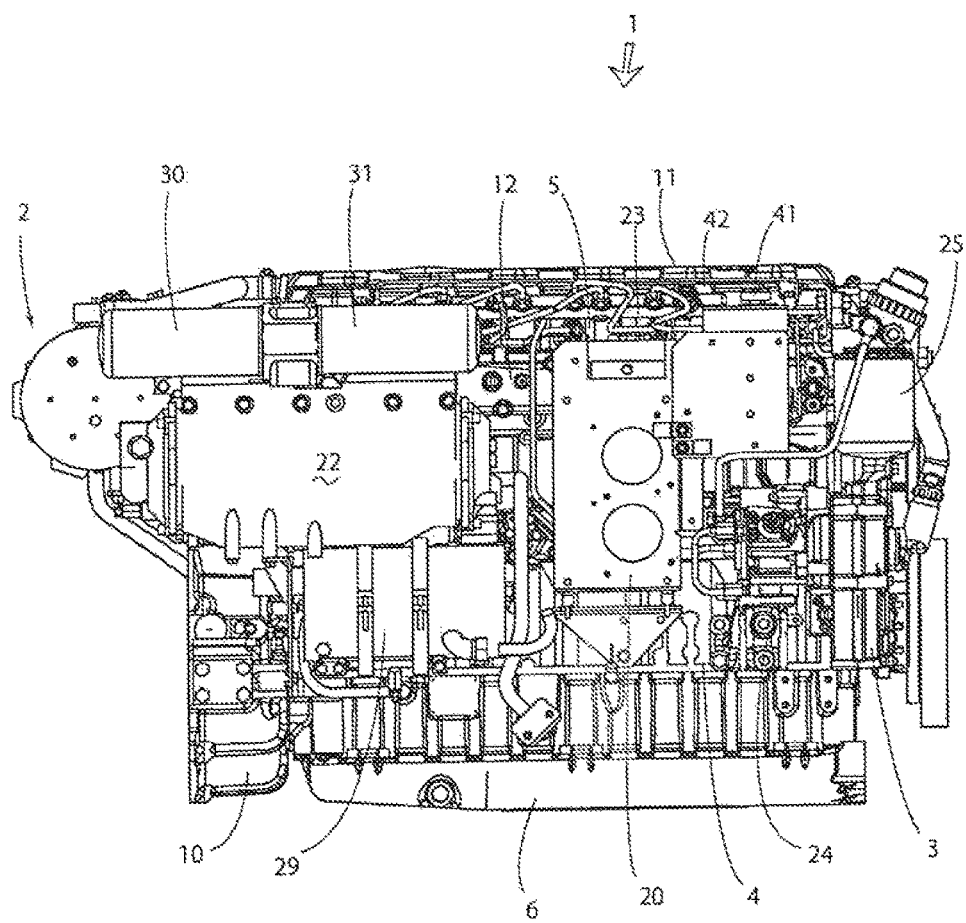
FIG. 3 is a side view of the engine.
Figure 4:
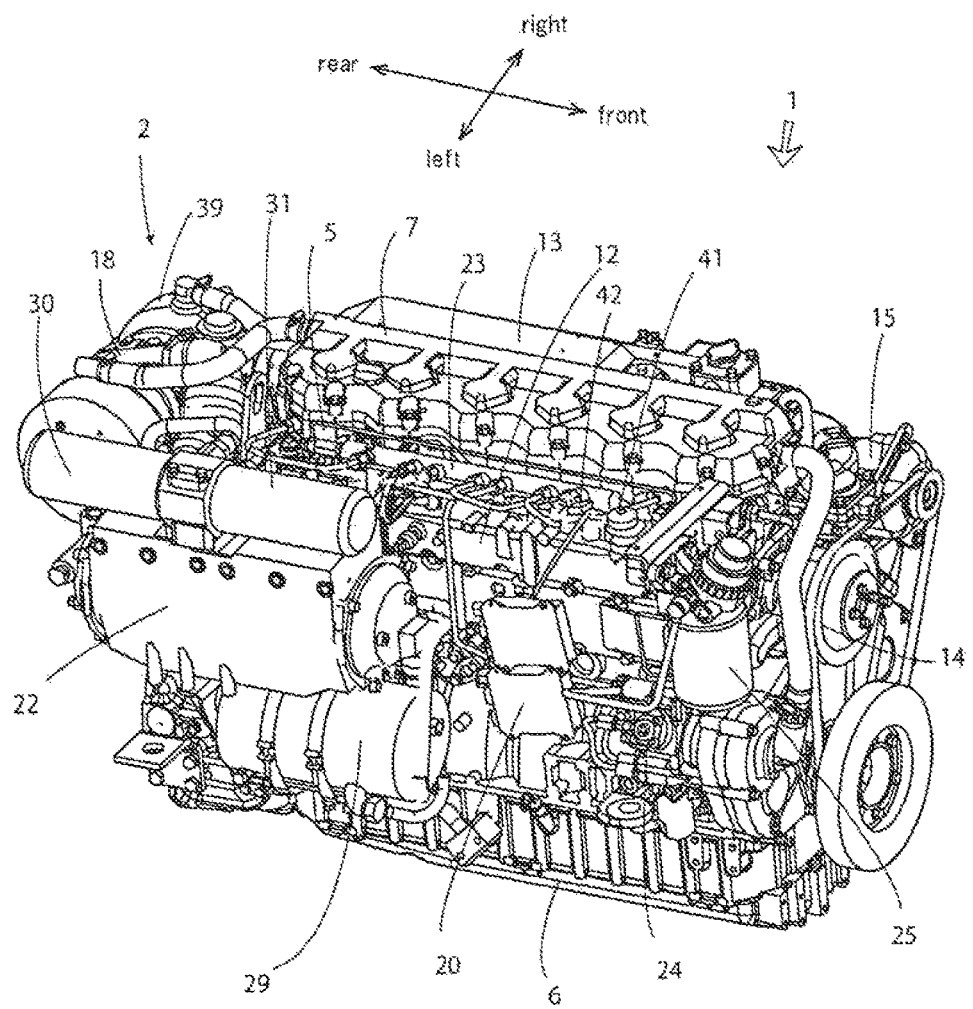
FIG. 4 is a perspective view of a state in which a top cover is detached.
Figure 5:
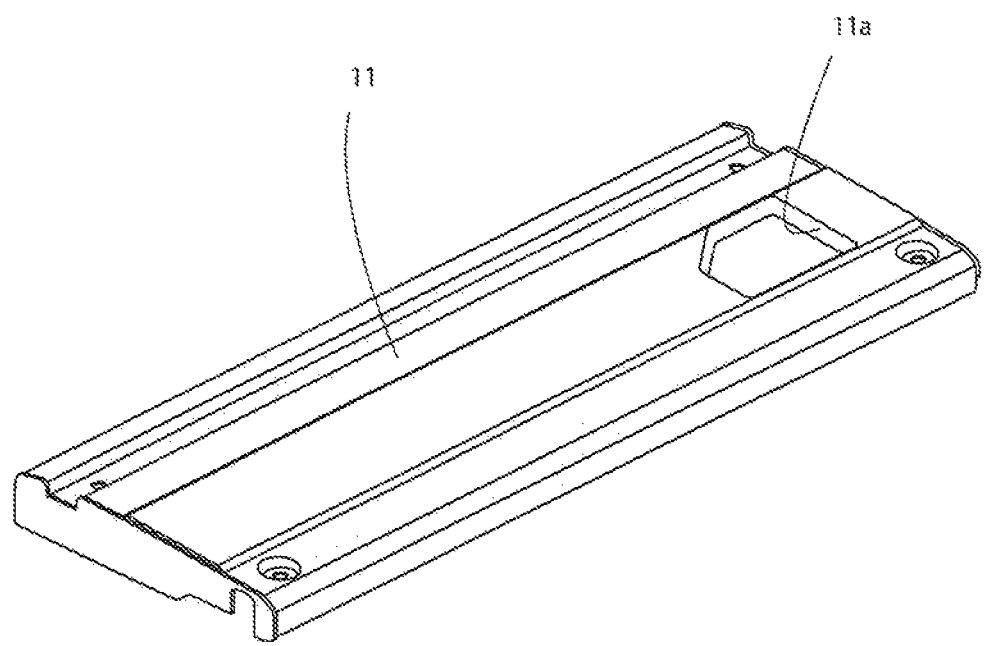
FIG. 5 is a perspective view of the top cover.

Firstly, an entire configuration of an engine 1 according to the present invention is explained referring to FIGS. 1 to 4. In below explanation, a direction of a crankshaft of the engine 1 is regarded as a longitudinal direction, and a side of an output shaft of the engine 1 is regarded as a rear side.

The engine 1 is arranged in an engine room formed in a bottom of a ship. In the engine 1, a cylinder block 4 in which a plurality of pistons are housed longitudinally is provided, and a cylinder head 5 is provided at an upper end of the cylinder block 4 and covers the upper end. An oil pan 6 is provided at a lower end of the cylinder block 4 and pools lubricating oil. An upper surface of the cylinder head 5 is covered by a rocker arm chamber casing 7, and a rocker arm chamber (not shown) for housing a rocker arm, a fuel injection valve and the like is formed in the rocker arm chamber casing 7.

In the cylinder block 4, as crankshaft 8 is provided substantially horizontally so as to be extended longitudinally. A flywheel 9 is attached to a rear end of the crankshaft 8. The flywheel 9 is covered b a flywheel housing 10 fixed to a rear end of the cylinder block 4.

A gear casing 3 is attached to a front surface of the cylinder block 4. A lubricating oil pump is housed in a left side of the gear easing 3. A seawater pump 27 is attached to a rear surface of a right side of the gear easing 3. A fresh water pump 14 is attached to an upper left part of the gear casing 3. An alternator 15 is attached to an upper right part of the gear casing 3. The fresh water pump 14 and the alternator 15 are driven by the crankshaft 8 via pulleys and a belt, and the front surface is covered by a belt cover 16.

An exhaust manifold 13 is provided for substantially the same length as the cylinder head 5 in a right side surface of the cylinder head 5 along the right side surface. A container box 26 for various relays, a fuse and the like is provided at a right outer side of the exhaust manifold 13. Below the exhaust manifold 13, the seawater pump 27 which pumps up seawater as cooling water and a fresh water cooler 28 which cools fresh water supplied to a cooling jacket of a main body of the engine 1 for cooling by heat exchange with the seawater are disposed in this order from the front side.

Behind the cylinder head 5, a supercharger 2 is provided. A part of fresh water from the fresh water cooler 28 is supplied to the supercharger 2 and a casing 39 which covers a turbine rotated by exhaust gas of the supercharger 2 is cooled by the fresh water.

An intake manifold 12 is provided for substantially same length as the cylinder head 5 in a left side surface of the cylinder head 5 along the left side surface. A rear part of the intake manifold 12 is communicated with a compressor 18 of the supercharger 2 via an intake passage. An intercooler 22 cooling intake air from the supercharger 2 by heat exchange with seawater is arranged at a left side of the rear part of the intake manifold 12.

Above the intake manifold 12, a common rail 23 is disposed in parallel to the intake manifold 12. The common rail 23 is connected to an injector (not shown) which injects fuel, sent pressingly from a fuel pump 24, from the common rail 23 via a high pressure pipe to each combustion chamber. The fuel pump 24 is disposed in a front part of a left side surface of the cylinder block 4 and a fuel filter 25 is arranged above the fuel pump 24 so as to supply filtered fuel. Upper parts of the common rail 23 and the intake manifold 12 are covered by a top cover 11.

Oil filters 30 and 31 are connected longitudinally to each other and arranged above the intercooler 22, and an oil cooler 29 is disposed below the intercooler 22. A control unit 20 is arranged in a space between the oil filters 30 and 31, the intercooler 22 and the oil cooler 29 arranged at the rear side and arrayed vertically and the fuel filter 25 and the fuel pump 24 arranged at the front side and arrayed vertically, and a side surface of the control unit 20 is covered by an electric box 21. The control unit 20 has an ECU (engine control unit), a relay, a driver and the like.

In this configuration, high pressure fuel obtained by compression with the fuel pump 24 is distributed via the common rail 23 to the injector arranged for each of the cylinders, and fuel injection amount, injection timing and the like are controlled suitably with the control unit 20, whereby a common rail type electronic control fuel injection system is formed.

Cooling seawater for heat exchange is pumped up from a seawater inlet with the seawater pump 27. The pumped seawater flows from the seawater puny 27 to the fresh water cooler 28, the intercooler 22 and the oil cooler 29 and is heat-exchanged respectively.

Next, the top cover 11 and an engine side operation part 40 of the present invention are explained referring to FIGS. 1, 4 to 8.

The top cover 11 is configured plate-like and covers upper parts of the control unit 20, the common rail 23 and the intake manifold 12. The top cover 11 is fixed to the cylinder head 5 and the intake manifold 12 with bolts or the like. A blank part 11a is formed so as to penetrate vertically a left side of a front part of the top cover 11. The blank part 11a is arranged substantially above the control unit 20. Namely, the blank part 11a is shifted toward the control unit 20. The blank part 11a is configured by an opening (hole) or a notch. In this embodiment, the opening is employed. A shape of the opening is not limited and the opening has enough size for operating the engine side operation part 40 discussed later. A lid may be provided to the blank part 11a so as to prevent intrusion of dust and the like.

The engine side operation part 40 is arranged so as to thee the blank part 11a. The engine side operation part 40 is arranged at a position above the intake manifold 12 at which temperature is not high, and arranged in a space near the upper part of the control unit 20 and surrounded by the oil filter 31, the common rail 23, the fuel filter 25 and the intake manifold 12, and covered by the top cover 11 and the electric box 21. The engine side operation part 40 includes an emergency stop switch 41, a maintenance connector 42 and a fuse box 46 of a control system. The engine side operation part 40 is not limited to the emergency stop switch 41, the maintenance connector 42 and the fuse box 46 of the control system, and an accelerator lever (control lever) and the like may be arranged.

The emergency stop switch 41 is configured by a push button switch and connected to the control unit 20 or the injector, whereby fuel supply is stopped by pushing the emergency stop switch 41 so as to stop the engine 1. Accordingly, at maintenance of the engine 1, or when a problem occurs in a ship operation part such as a cabin of the ship and emergency stop is required, the engine 1 can be stopped by operating, the emergency stop switch 41 through the blank part 11a.

Figure 7:
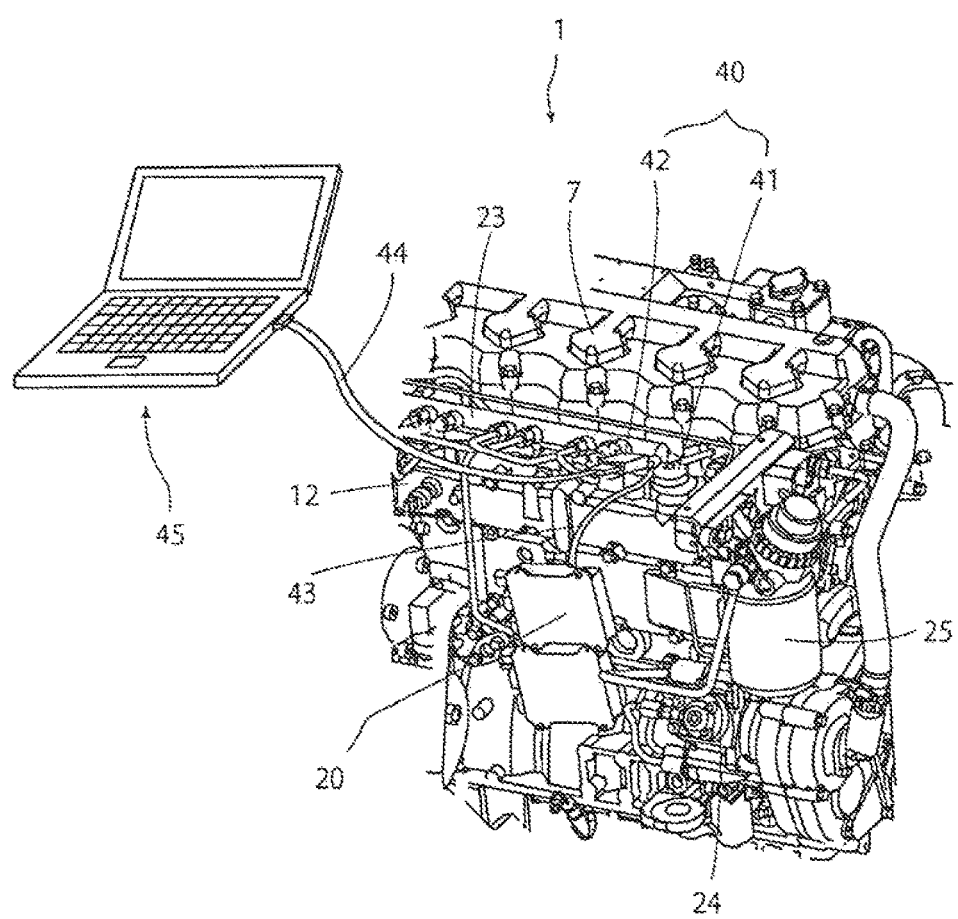
FIG. 7 is a perspective view of a state in which an operation device is connected to a maintenance connector.
Figure 8:
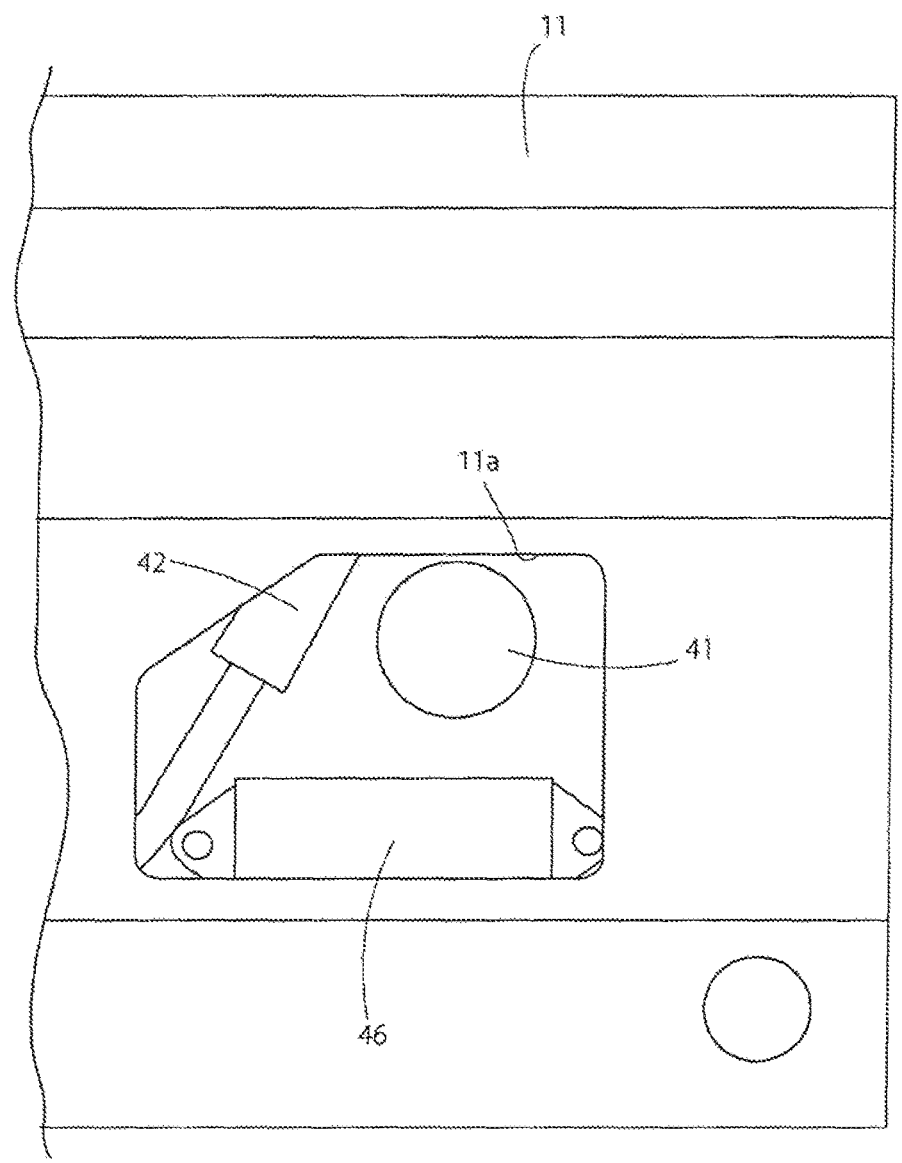
FIG. 8 is a plan view of the engine side operation part.

As shown in FIG. 7, the maintenance connector 42 is connected to the control unit 20 via a wire 43. An opening side of the maintenance connector 42 can be connected to a connector provided at one of ends of a connection cable 44. The other end of the connection cable 44 can be connected to an operation device 45 which is a personal computer or the like. By connecting the operation device 45 to the control unit 20 via the connection cable 44, the maintenance connector 42 and the wire 43, maintenance work such as reading of data stored in the control unit 20 into the operation device 45, rewriting of programs and set values of the control unit 20, and operation of the injector, a valve, a motor and the like by manual operation of the operation device 45 can be performed.

The fuse box 46 of the control system houses a fuse provided between the control unit 20 and a battery power source. An upper part of the fuse box 46 is covered by a lid so as to exchange the fuse from an upper side.

Figure 6:
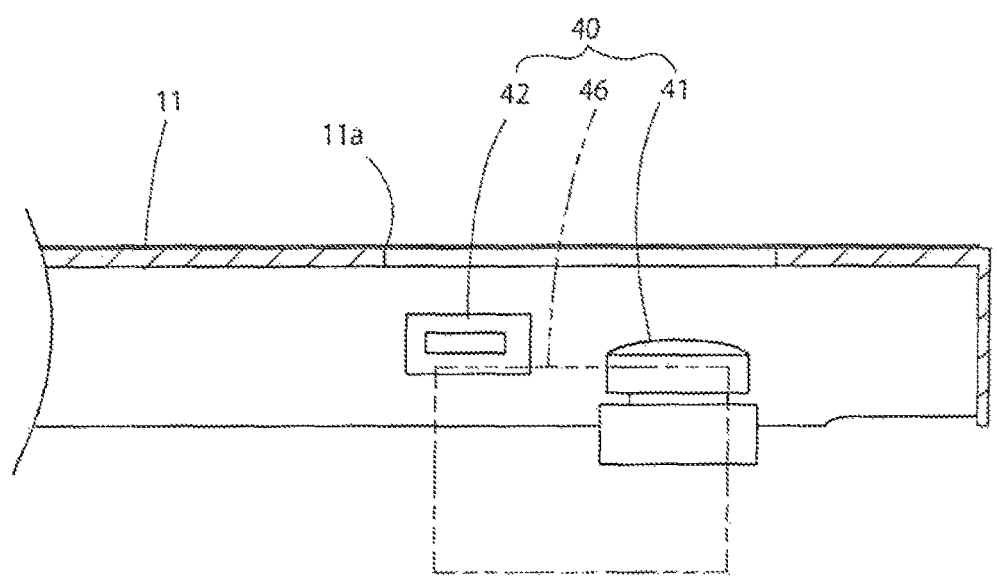
FIG. 6 is a sectional view of an engine side operation part.

As shown in FIG. 6, each of upper ends of the emergency stop switch 41, the maintenance connector 42 and the fuse box 46 of the control system which constitute the engine side operation part 40 is positioned lower than upper surfaces the top cover and the fuse box 46 of the control system. Namely, the emergency stop switch 41, the maintenance connector 42 and the fuse box of the control system are not projected upward from the to cover 11 while arranged in the blank part 11a so as not to be obstructive to an operator walking on the top cover 11.

As the above, in the top cover 11 provided on an upper surface of the engine 1 arranged in the engine room of the ship, the blank part 11a is formed so as to penetrate vertically the top cover 11, the engine side operation part 40 is arranged so as to face the blank part 11a, and the upper end of the engine side operation part 40 is positioned lower than the upper surface of the top cover 11, whereby an operator can access easily to the engine side operation part 40 from the upper side in the engine room. Namely, from above the blank part 11a, the emergency stop switch 41 can be operated easily, connection operation to the maintenance connector 42 can be performed easily, and the fuse housed in the fuse box 46 of the control system can be exchanged easily. Operation and maintenance of the engine 1 can be performed without detaching the top cover 11. Since the engine side operation part 40 is lower than the upper surface of the top cover 11, the emergency stop switch 41, the maintenance connector 42 and the fuse box 46 of the control system are protected with the top cover 11 without being damaged by accidentally tramping and being stumbled thereon.

The control unit 20 is arranged in a side surface of the engine 1, the engine side operation part 40 is connected to the control unit 20, and when viewed in plan, the blank part 11a of the top cover 11 in which the engine side operation part 40 is arranged is shifted toward the control unit 20, whereby wiring between the control unit 20 and the engine side operation part 40 can be shortened and management becomes easy.

The engine side operation part 40 has the emergency stop switch 41, the maintenance connector 42 and the fuse box 46 of the control system, whereby necessary minimum parts of the emergency stop switch 41, the maintenance connector 42 and the fuse box 46 of the control system can be housed in the small blank part 11*a*. Accordingly, the engine can be stopped quickly with the emergency stop switch 41 without moving to the operation part and performing stop operation at the time of the maintenance, the control unit 20 can be connected to the operation device 45 without detaching the top cover 11, and the fuse housed in the fuse box 46 of the control system can be exchanged easily.

DESCRIPTION OF NOTATIONS

1 engine
11 top cover
11*a* blank part
20 control unit
40 engine side operation part
41 emergency stop switch
42 maintenance connector
46 fuse box

What is claimed is:

1. An engine arranged in an engine room, comprising:

a top cover provided on an upper surface of the engine;

an opening formed in a top surface of the top cover, the opening vertically penetrating the top surface of the top cover; and an engine side operation part arranged in the opening so as to face the opening, the engine side operation part comprising an emergency stop switch, a maintenance connector and a fuse box of a control system, and wherein an upper end of each of the emergency switch, the maintenance connector, and the fuse box of the control system is positioned lower than an upper surface of the top cover.

2. The engine according to claim 1, wherein a control unit controlling the engine is arranged in a side surface of the engine, and wherein the engine side operation part is operatively connected to the control unit, and wherein the opening of the top cover in which the engine side operation part is arranged is shifted toward the control unit in top planar view.

* * * * *